(12) United States Patent
Gough

(10) Patent No.: US 6,276,814 B1
(45) Date of Patent: Aug. 21, 2001

(54) LIGHTING APPLIANCE

(75) Inventor: Keith Gough, Merseyside (GB)

(73) Assignee: Bridisco Limited, London (GB)

( * ) Notice: Subject to any disclaimer, the term of this patent is extended or adjusted under 35 U.S.C. 154(b) by 0 days.

(21) Appl. No.: 09/531,535

(22) Filed: Mar. 21, 2000

(30) Foreign Application Priority Data

Nov. 13, 1999 (GB) .................................................. 9926790

(51) Int. Cl.[7] .................................................. F21V 33/00
(52) U.S. Cl. .......................... 362/228; 362/229; 362/276; 362/802
(58) Field of Search .................................. 362/228, 229, 362/235, 802, 276

(56) References Cited

U.S. PATENT DOCUMENTS

| 3,038,062 | * | 6/1962 | Liberman | 362/229 |
| 3,930,148 | * | 12/1975 | Gruen | 362/228 |
| 5,662,411 | * | 9/1997 | Haslam | 362/276 |
| 5,785,413 | * | 7/1998 | Tillinghast et al. | 462/228 |
| 6,022,125 | * | 2/2000 | Bartesevich et al. | 362/228 |
| 6,100,803 | * | 8/2000 | Chang | 340/567 |

* cited by examiner

Primary Examiner—Thomas M. Sember
(74) Attorney, Agent, or Firm—Williams, Morgan, Amerson, P.C.

(57) ABSTRACT

An energy saving lighting appliance in which, in a single housing (10), there is housed a tungsten halogen (TH) lamp (11) and a low energy (PL) lamp (13). A further housing (16) contains a PIR sensor (17) and CDS cell (18). A selector switch (25) and timing devices (26, 27, 28) are provided to determine automatic illumination and extinguishing as required, of the two lamps.

10 Claims, 2 Drawing Sheets

LIGHTING APPLIANCE

THIS INVENTION concerns a lighting appliance principally though not exclusively for use on the exterior of a building and adapted to provide illumination with minimum usage of electrical energy.

Low energy lighting appliances are known comprising a PL lamp which provides light output equivalent to that of a conventional lamp having a tungsten filament bulb but at a quarter (or less) power consumption.

Similarly, it is known to provide tungsten halogen (TH) flood lamps which produce high brilliance typically at between 100 and 500 watts power consumption.

An object of the present invention is to provide a lighting appliance which combines the advantages of these two known lamps and operable to ensure maximum energy saving.

According to the present invention there is provided a lighting appliance comprising a tungsten halogen (TH) flood lamp, a low energy (PL) lamp, and control means including a PIR sensor and a daylight sensor, the control means being selectable to cause the PL lamp and the (TH) lamp to be illuminated and extinguished automatically when required.

Preferably, the TH and PL lamps are contained within a common housing to which is adjustably attached a further housing containing a PIR and daylight sensor.

The lamp housing may include a bracket for attachment to a wall.

The lighting appliance preferably includes at least one timing device to determine the period of illumination of one or both of the lamps.

The PIR sensor preferably includes means for adjusting the effective range of operation thereof.

Figure 1:
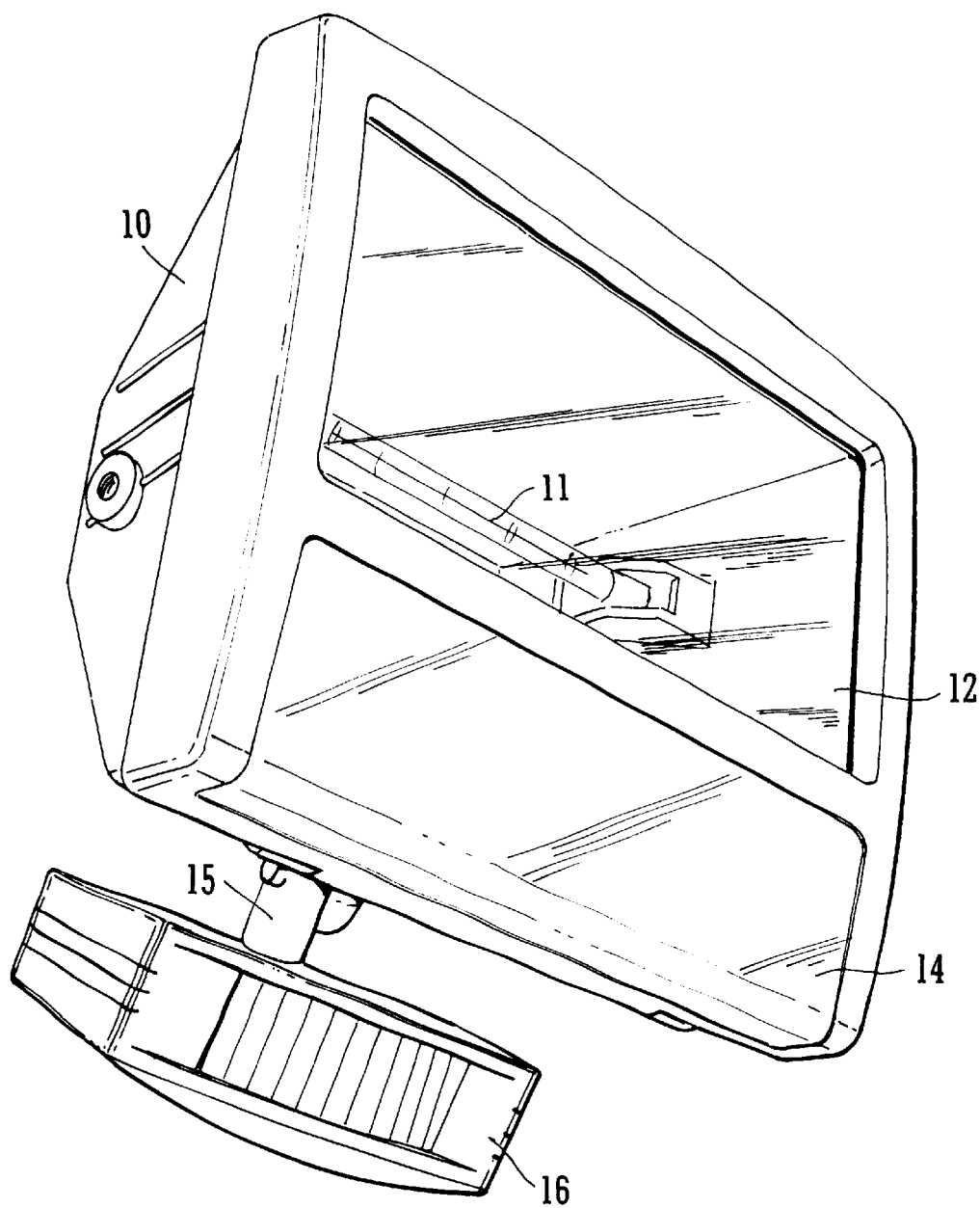
Figure 2:
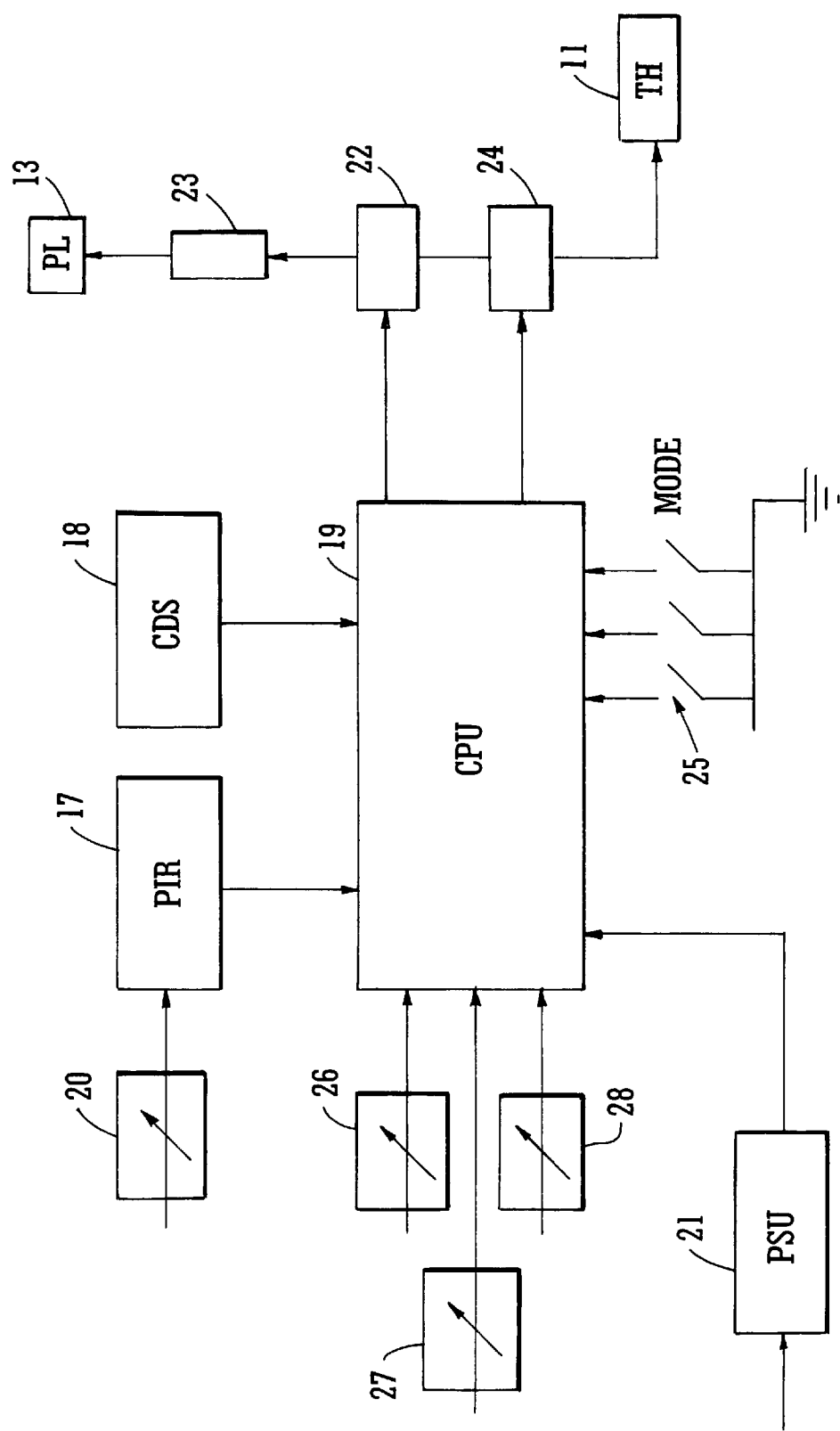

An embodiment of the invention will now be described, by way of example only, with reference to the accompanying drawings, in which:

FIG. 1 is a perspective view of a lighting appliance made in accordance with the invention; and FIG. 2 is a block circuit diagram.

The appliance comprises a housing 10 attachable by a bracket (not shown) to a wall and containing a tungsten halogen TH lamp 11 behind a transparent lens 12, and a low energy PL lamp 13 behind a translucent lens 14. Adjustably attached to the base of the housing 10 at 15 is a further housing 16 containing a PIR sensor 17 and CDS (photo-cell) 18.

Control means for the appliance consists essentially of a CPU 19 to which is connected the PIR sensor 17 and the CDS cell 18. A variable control device 20 enables adjustment of the range of operation of the PIR sensor 17. A power supply unit 21 delivers a 240 volt supply to the CPU 19, the output of which is connected to a relay or triac 22 and, via ballast 23, to the low energy PL lamp 13.

A second relay/triac 24 is connected to the TH lamp 11.

A mode select switch 25 determines operation of the lamps as follows:

In a first selected mode CPU 19 controls the lamps such that the PL lamp 13 is illuminated from dusk to dawn as determined by the CDS cell 18. Also in this mode the TH lamp 11 is illuminated (from dusk to dawn) when triggered by a signal from the PIR sensor 17. A timer 26 may be set to determine the duration of illumination of the TH lamp after it is triggered, e.g. ten seconds to ten minutes. The timer 26 may take the form of a potentiometer located for access beneath the housing 16.

In a second selected mode the CPU 19 controls the lamps such that the TH lamp is illuminated for a time determined by the timer 26 after being triggered by a signal from the PIR sensor 17, the PL lamp being simultaneously illuminated and remaining so for a period determined by a further timer 27, which may be set for 5, 10, 15, 30 or 60 minutes after the TH lamp has been extinguished.

In a third mode the CPU 19 permits a manual override such that the TH lamp may be switched on manually for a preset time, e.g. 0.5, 1, 2 or up to 5 hours, as determined by a third timer 28, irrespective of illumination of the PL lamp.

The device has three timer options determined by the various timers and the CPU 19; these are:

a) the period during which the TH lamp remains illuminated.

b) the period during which the PL lamp remains illuminated.

c) the period during which the TH lamp remains illuminated after manual switching.

The timers 26, 27 and 28 may be all sited to be adjustable by the user, or some may be built into the CPU 19 and pre-set or adjustable electronically.

What is claimed:

1. A lighting appliance comprising a tungsten halogen (TH) floodlamp, a low energy (PL) lamp and control means including a PIR sensor and a daylight sensor, the control means being selectable to cause the PL lamp and TH lamp to be illuminated and extinguished automatically when required.

2. A lighting appliance according to claim 1, wherein the TH and PL lamps are contained within a common housing to which is adjustably attached a further housing containing a PIR and daylight sensor.

3. A lighting appliance according to claim 1, including a bracket for attachment of the appliance to a wall.

4. A lighting appliance according to claim 1, including at least one timing device to determine a period of illumination of one or both of the lamps.

5. A lighting appliance according to claim 1, wherein the PIR sensor includes means for adjusting an effective range of operation thereof.

6. A lighting appliance according to claim 1, wherein the control means is selectable according to a first mode wherein the PL lamp is illuminated from dusk to dawn, as determined by the daylight sensor, and wherein the TH lamp is illuminated from dusk to dawn when triggered by a signal from the PIR sensor, a first timer being provided and adjustable to determine a duration of illumination of the TH lamp after it is triggered.

7. A lighting appliance according to claim 1, wherein the control means is selectable according to a second mode wherein the TH lamp is illuminated for a time determined by a first timer after being triggered by a PIR sensor and wherein the PL lamp is simultaneously illuminated and remains so for a period determined by a second timer.

8. A lighting appliance according to claim 1, wherein the control means is selectable according to a third mode wherein the TH lamp may be switched on manually for a pre-set time as determined by a third timer irrespective of whether the PL lamp is illuminated.

9. A lighting appliance according to claim 1, including three separate timers, one to determine a duration of illumination of the TH lamp, another to determine a duration of illumination of the PL lamp, and a third to determine a duration of illumination of the TH lamp alone.

10. A lighting appliance according to claim 9, wherein one or more of the timers is located thus to be adjustable selectively by a user.

* * * * *